(12) United States Patent
Lederer et al.

(10) Patent No.: US 8,679,383 B2
(45) Date of Patent: Mar. 25, 2014

(54) DEVICE FOR AND METHOD OF DETERMINING RESIDENCE TIME DISTRIBUTIONS

(75) Inventors: Klaus Lederer, Kalwang (AT); Beatrix Lederer, legal representative, Kalwang (AT); Wolfgang Reinberger, Graz (AT)

(73) Assignee: Montanuniversitaet Leoben, Leoben (AT)

( * ) Notice: Subject to any disclaimer, the term of this patent is extended or adjusted under 35 U.S.C. 154(b) by 765 days.

(21) Appl. No.: 12/521,590

(22) PCT Filed: Dec. 28, 2007

(86) PCT No.: PCT/EP2007/011455
§ 371 (c)(1),
(2), (4) Date: Dec. 3, 2010

(87) PCT Pub. No.: WO2008/080617
PCT Pub. Date: Jul. 10, 2008

(65) Prior Publication Data
US 2011/0074058 A1   Mar. 31, 2011

(30) Foreign Application Priority Data
Dec. 29, 2006  (EP) .................................. 06027061
Dec. 29, 2006  (EP) .................................. 06027062

(51) Int. Cl.
*B29C 47/92*   (2006.01)
(52) U.S. Cl.
USPC ....................................... 264/40.7; 264/40.1
(58) Field of Classification Search
USPC ............................................... 264/40.1, 40.7
See application file for complete search history.

(56) References Cited

U.S. PATENT DOCUMENTS 5,062,713 A    11/1991  Farquharson et al.
5,739,193 A *  4/1998  Walpita et al. ............... 524/413

FOREIGN PATENT DOCUMENTS

DE    20 29 337 B1    11/1971
GB    2 086 134 A      5/1982

OTHER PUBLICATIONS

Giurgiutiu, Victor (2008). Structural Health Monitoring with Piezoelectric Wafer Active Sensors. (pp. 25). Elsevier. Online version available at: http://www.knovel.com/web/portal/browse/display?_EXT_KNOVEL_DISPLAY_bookid=4796&VerticalID=0.*
Stevens, Malcolm, "Polymer Chemistry", Oxford University Press, 1999.*
Baeten et al., Barium Titanate Characterization by Differential Scanning Calorimetry, Journal of European Ceramic Society 26 (2006), pp. 589-592.
Gour S. Choudhury and Akhilesh Gautam, "On-Line Measurement of Residence Time Distribution in a Food Extruder," Journal of Food Science, vol. 63, No. 3, 1998, pp. 529-534.
Joseph C. Golba, Jr., "A New Method for the On-Line Determination of Residence Time Distributions in Extruders," ANTEC, 1980, pp. 83-87, XP008091818.

* cited by examiner

*Primary Examiner* — Galen Hauth
(74) *Attorney, Agent, or Firm* — Robert A. Blaha; Smith Risley Tempel Santos LLC

(57) ABSTRACT

A method of determining a residence time distribution comprises mixing a molding batch (104) and a tracer (105), wherein the tracer has a ferroelectric curie temperature above 120° C., and transmitting the mixture through a capacitor (107). Further, the method comprises measuring a capacitance of the capacitor, and determining a residence time distribution based on the measured capacitance. In particular, the ferroelectric curie temperature of the tracer may be above 150° C. and preferably the ferroelectric curie temperature of the tracer is above 200° C.

7 Claims, 3 Drawing Sheets

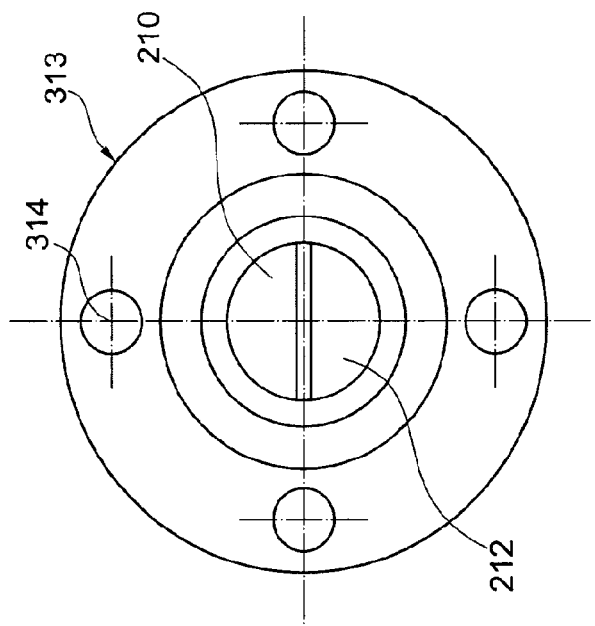
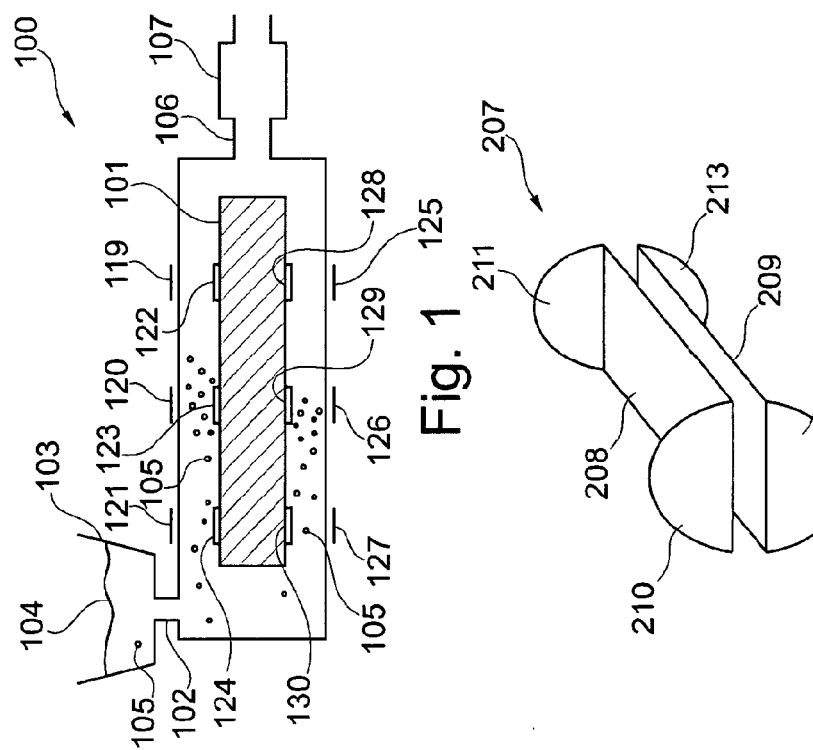
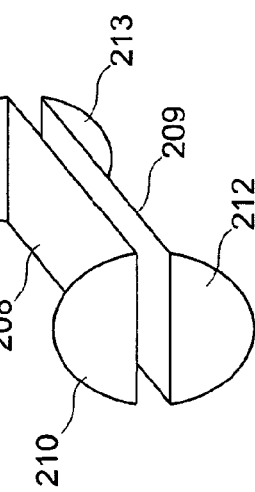
Fig. 1
Fig. 2
Fig. 3

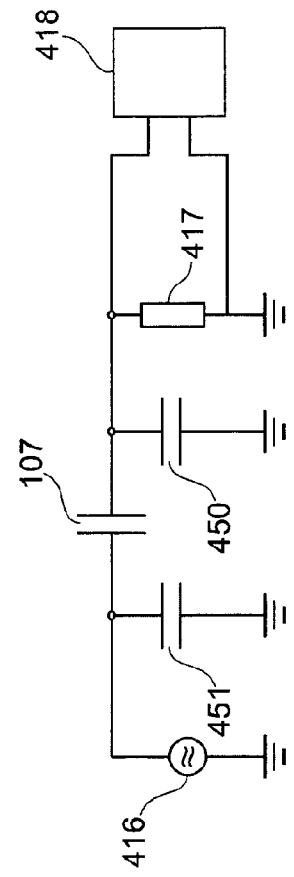
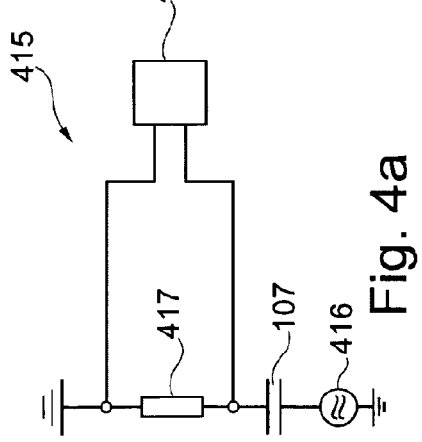
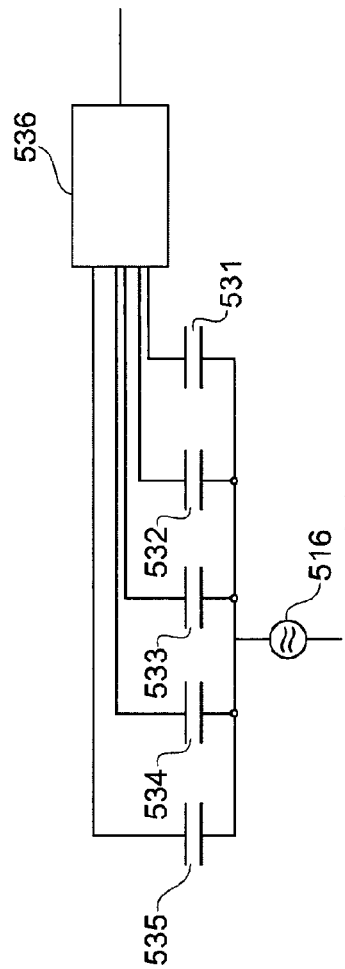
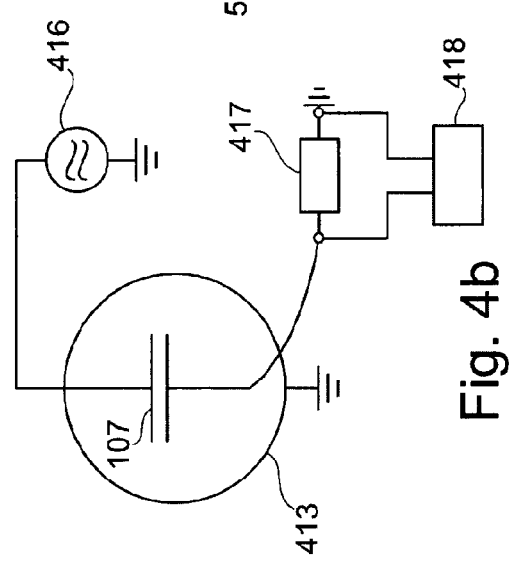

DEVICE FOR AND METHOD OF DETERMINING RESIDENCE TIME DISTRIBUTIONS

FIELD OF THE INVENTION

The invention relates to a device for and a method of determining a residence time distribution. Further, the invention relates to a computer-readable medium and to a program element. In particular, the invention relates to a method of determining a residence time distribution of a molding batch in an extruder.

BACKGROUND OF THE INVENTION

From "A New Method for On-line Determination of Residence Time Distributions in Extruders", J. Golba, Polymer Physics & Engineering Branch Corporate Research and Development Center Schenectady, New York Technical Papers, Regional Technical Conference—Society of Plastics Engineers (1980) p. 83 to 87, it is known that the experimental determination of residence time distributions (RTD) is a critically important aspect of most analyses of the extrusion process. In essence, these distributions quantify the thermal and deformational histories experienced by the polymer system during processing. Such considerations are not limited to just an average set of process conditions for some average value of time. Instead the history of the polymer may be described in terms of a set of process conditions over a distribution of times. With appropriate models the variance of the RTD can be correlated with overall mixing in the extruder. The problematic tail of the distribution resulting from stagnant flow can also be characterized. In the realm of the extruder chemistry a more quantitative description of reactor behaviour is possible. Finally, RTD's play an important role in the experimental verification of theoretical models for extrusion processes. In fact, in many cases where the more common melt pressure profile-throughput experiments are not possible, e.g., starve fed co-rotating twin screw extrusion, they provide the most useful data for comparison.

The most common technique for experimentally determining RTD uses a pulse input or a tracer. The extruder is first equilibrated under a given set of operating conditions. The tracer is injected and the extrudate collected and sectioned over some specified time interval. Each section is then analysed for tracer concentration and the appropriate distribution curve is constructed. A number of different tracers can be used depending on the analytical capability available. While this procedure is quite acceptable, it tends to be very time consuming and relatively expensive. As a result extensive mappings of RTD's as a function of screw design, operating characteristics, and process material properties are nearly impossible to determine. An alternative approach would be the continuous, on-line determination of residence time distributions. Such a methodology should permit, at least in principle, the rapid generating of a large number of curves necessary to more completely characterize an extrusion process.

SUMMARY OF THE INVENTION

Therefore, there may be a need to provide a device for and a method of determining a residence time distribution which may be easier to handle and less prone to errors.

This need may be met by a device for and a method of determining a residence time distribution, a program element, and a computer readable medium according to the features of the independent claims. Further embodiments are described in the dependent claims.

According to a first exemplary aspect of the invention a method of determining a residence time distribution comprises mixing a molding batch and a tracer, wherein the tracer has a ferroelectric curie temperature above 120° C., and transmitting the mixture through a capacitor. Further, the method comprises measuring a capacitance of the capacitor, and determining a residence time distribution based on the measured capacitance. In particular, the ferroelectric curie temperature of the tracer may be above 150° C. and preferably the ferroelectric curie temperature of the tracer is above 200° C. Preferably, the tracer is dispersed before it is mixed with the molding batch. In particular, the tracer material may be mixed with the molding batch by introducing a single tablet, pill or pellet. The pellet may be produced by pressing powder of a tracing material. Optionally, a dispersing substance, e.g. cod-liver oil, may be used in the fabrication of the pellet.

According to the first exemplary aspect of the invention a program element is provided, which, when being executed by a processor, is adapted to control or carry out a method of determining a residence time distribution, wherein the method comprises mixing a molding batch and a tracer, wherein the tracer has a ferroelectric curie temperature above 120° C., and transmitting the mixture through a capacitor. Further, the method comprises measuring a capacitance of the capacitor, and determining a residence time distribution based on the measured capacitance. In particular, the ferroelectric curie temperature of the tracer may be above 150° C. and preferably the ferroelectric curie temperature of the tracer is above 200° C.

According to the first exemplary aspect of the invention a computer-readable medium is provided, in which a computer program is stored, which, when being executed by a processor, is adapted to control or carry out a method of determining a residence time distribution, the method comprising mixing a molding batch and a tracer, wherein the tracer has a ferroelectric curie temperature above 120° C., and transmitting the mixture through a capacitor. Further, the method comprises measuring a capacitance of the capacitor, and determining a residence time distribution based on the measured capacitance. In particular, the ferroelectric curie temperature of the tracer may be above 150° C. and preferably the ferroelectric curie temperature of the tracer is above 200° C.

According to the first exemplary aspect of the invention a device for determining a residence time distribution comprises a container adapted to receive a mixture comprising an molding batch and a tracer, wherein the tracer has a ferroelectric curie temperature above 120° C., and a capacitor adapted in such a way that the mixture can be pressed therethrough. Further, the device comprises an electronic circuit adapted to measure the capacitance of the capacitor while the mixture is pressed through the capacitor, and a determination unit adapted to determine the residence time distribution based on the measured capacitance. Preferably, the container is filled with the mixture comprising the molding batch or extrusion material and the tracer, wherein the tracer has a ferroelectric curie temperature above 120° C. In particular, the device may further comprises a heater adapted to heat the mixture to a temperature above 120° C., preferably the heater is adapted to heat the mixture to a temperature in the range between 120° C. and 300° C.

Furthermore, according to the first exemplary aspect of the invention a usage of a tracer, in particular a Perowskite, having a ferroelectric curie temperature of more than 120° C. in a residence time distribution measurement is provided. Preferably, the residence time distribution measurement may be a continuous residence time distribution measurement.

According to a second exemplary aspect of the invention a device for determining a residence time distribution of a molding batch comprises a cavity adapted in such a way that the molding batch is pressable through the cavity, a plurality of capacitors arranged at the cavity in such a way the molding batch pressed through the cavity changes the capacitance of the capacitors and a determination unit adapted to determine a residence time distribution based on measured capacitances of the plurality of capacitors.

According to the second exemplary aspect of the invention a method of determining a residence time distribution of a molding batch in a device comprising a cavity, and a plurality of capacitors arranged at the cavity is provided, wherein the method comprises introducing a molding batch into the cavity, measuring the capacitances of the plurality of capacitors, and determining the residence time distribution based on the measured capacitances. For instance, the method may be implemented as software or as a dedicated hardwired circuitry, e.g. as a program element, which, when being executed by a processor, is adapted to control or carry out a method of determining a residence time distribution of a molding batch according to an exemplary embodiment of the method. Furthermore, a computer program stored on a computer-readable medium may be provided, wherein the computer program, when being executed by a processor, is adapted to control or carry out a method of determining a residence time distribution of a molding batch according to an exemplary embodiment of the method.

By using a method according to the second exemplary aspect a method may be providable which provides more information about the residence time distribution profile.

In the context of this application, the term "residence time" may refer to a time-span a material stays in a system or device, for example, in an extruder. In case of an extruder the residence time may characterizes the time-span between the point in time the material enters the extruder and the point in time the material exits the extruder, i.e. the time-span the material needs to pass the system comprising cylinder and screw of a screw extruder. In particular, each particle of the material may have a different residence time since each particle may travel a different path through the extruder or may have a different velocity. The mixing may be performed by introducing a single pressed pellet into the molding batch. However, the mixing may also be performed by mixing a plurality of pressed tracer pellets with the molding batch. In case a single pellet of tracer material is mixed into the molding batch, this pressed pellet may be crushed in the extruder so that a plurality of tracer particles may be present in the extruder, which can be measured afterwards by the system. Thus, a distribution of residence times may be measured in case a certain amount of particles, e.g. tracer particles, is used. By using this residence time distribution or residence time spectrum, which in its static case corresponds to a distribution function, it may be possible to characterize every system. The term plastic material may refer to every material which can be easily shaped or molded, e.g. specific kinds of polymers.

In the context of this application the term "tracer" may refer to a material which is easily traceable and which is mixed in small amounts into a basic material, e.g. a molding batch, i.e. a mass which can be used to manufacture products by using an extruder or extrusion device. The tracer or tracing material may also be called indicator.

A gist of the first exemplary aspect of the invention may be seen in the fact that a determination or evaluation device and method is provided to determine the residence time distribution of a material in a system, e.g. an extruder. For determining the residence time a measured capacitance of a capacitor may be used. In particular, the change of the measured capacitance may provide a good determination basis, in case a tracer material is introduced or mixed into the extrusion base material, e.g. a polymer, which tracer material is a ferroelectric material having a high ferroelectric curie temperature, e.g. above 120° C. Using such a tracer material may provide the advantage that it may be easily used in standard extrusion processes, in which temperatures between 100° C. and 300° C. are used. Preferably, the tracer is introduced into the system in a Dirac-pulse like manner, i.e. over a short time interval compared to the total residence time in the system, e.g. by introducing or mixing a single pellet of pressed tracer material into the molding batch. By using such a short time interval for injecting the mixed material it may be possible to determine the residence time spectrum in detail and then analyze in detail the mixing behavior, in particular the mixing behavior along a longitudinal axis of the system, in the system. Furthermore, the time span, which refers to the duration which is necessary that all material mixed with the tracer is ejected out of the system, may be deducible. This time span may be also referred to as a self-purification time, since this time span relates to the time period in which substantially all impurities introduced into the base material as a Dirac-pulse may be removed out of the system. This, self-purification time may be depending on the specific process parameters. The corresponding information, e.g. the mixing behavior and the self purification time, may be usable to optimize the process parameters and/or the system itself, e.g. the shape of the cylinder or the screw, in case the system is a screw extruder.

That is, by using a method of determining a residence time distribution according to an exemplary embodiment it may be possible to provide an effective continuous method for determining the residence time. Therefore, it may be possible to process the determined values on-line, that is while a test process of the system is performed. In particular, a process using a ferroelectric tracer material may be easier to handle and to analyze than known continuous methods. For such a continuous method it may be in particular possible to introduce a plurality of tracer pellets into the molding batch, wherein the time span between the introductions of the single tracer pellets may be selected in such a way that the signals influenced by the dispersed pellets are separated from each other. That is, a new pellet may be introduced when the influence of the last pellet on the signal is decayed.

The known continuous methods are depending either on the use of radioactive tracer material, which causes difficulties in handling the respective tracer, or on measuring parameters which are highly dependent on the temperature of the material. For example, in a known continuous method the determination relays on the inductive measurement of the magnetic susceptibility wherein the magnetic susceptibility is dependent on the temperature to the power of four in case of soft iron. Thus, this measurement needs a complex compensation for and/or monitoring of the influence of the temperature. Other known methods depend on the optical properties, like optical transmission or reflection. To make use of these optical methods it must be secured that the material is transparent at the used temperature, while the transparence should be independent of the molding batch temperature. Furthermore, the temperature must be stable, since the conductivity of semiconductors are temperature dependent and such semiconductors are usually used in connection with the light source and light detector. Also the known spectroscopy methods suffer on the same problems as the optical measurements. Furthermore, the reflection spectroscopy is based on reflection on thin layers on the surface of the material and is greatly dependent on a homogenous distribution of the absorber, e.g. the tracer mixed into the extrusion material. However, this supposition is usually not fulfilled in the known methods. In a similar manner ultrasonic methods, which are based on the detection of sound reflected from additives in the molding batch, suffer from a necessary complex compensating and monitoring of temperature effects.

Compared to these known residence time distribution determining methods a method according to an exemplary embodiment of the invention may have in particular the advantage that the temperature is by far not as critical as in the known methods. The use of electrical probabilities of a mixed material may be much less prone to temperature effects and in particular may be usable in a temperature range up to about 300° C. Further, by using a tracer or indicator as described above, i.e. a tracer having a ferroelectric curie temperature of more than 120°, it might be possible to measure the properties of the system, e.g. an extruder, in an efficient suitable way, while the functionality of the system is effected only negligible. Furthermore, by using such a tracer it might be possible that the tracer is easily and efficiently detectable after it has passed the system, e.g. by measuring the capacitance, in particular a change of the capacitance, of a capacitor arranged after the system passed by the extrusion material. In particular, it might be further possible that the duration of the injection of the tracer is small compared to the mean residence time, i.e. the time-span between the injection into the system and the point in time the material leaves the system.

A gist of a second exemplary aspect of the invention may be seen in the fact that a determination or evaluation device and method is provided to determine the residence time distribution of a material in a system, e.g. an extruder. For determining the residence time a measured capacitance of a capacitor may be used. In particular, the change of the measured capacitance may provide a good determination basis. By using a plurality of individual capacitors for the measurement a profile of residence time distributions may be achievable. In particular, it may be possible to analyze different paths or different sections of the path the molding batch travels through the cavity with respect to the residence times of the material in respective paths or sections of the path. That is, it may be possible to generate a plurality of residence time distributions, wherein each one relates to sections of the cavity either in the moving direction of the plastic material or substantially in a cross sectional profile. Such a cross sectional profile may show the different residence time distributions of the plastic material moving on different paths through the cavity. For example, plastic material moving along a more central part of the cavity might move faster or slower than plastic material moving along a more peripheral part of the cavity. Furthermore, it may be possible to analyze the residence time distributions in a finer segmented manner. That is, it may be possible to analyze whether the cross sectional profile of residence times distribution may change along the path in the cavity. In particular, it might be possible to increase a position resolution of the residence time distribution.

Next, further exemplary embodiments of the method of determining a residence time distribution will be explained. However, these embodiments also apply for the device for determining a residence time distribution, for the computer-readable medium, for the program element and for the usage of a tracer.

According to another exemplary embodiment the method further comprises heating the mixture to a temperature above 120° C. By heating the mixture to a temperature above 120° C. it may be possible to accelerate and to ease the extrusion process and to use a common extrusion process while still be able to use the ferroelectric properties of the tracer material. In particular, the mixture may be heated to a temperature between 100° C. and 300° C. which is a common temperature range for extrusion processes.

According to another exemplary embodiment the method further comprises detecting a change in the measured capacitance, and determining the residence time distribution based on the detected change in the measured capacitance. In particular, the change may relate to a change of the measured capacitance by a predetermined increase. Preferably, the predetermined increase is higher than 10%, more preferably higher than 20%. When a tracer having a high dielectric constant is used a change of the measured capacitance may be a suitable indicator for determining the residence time in the system.

According to another exemplary embodiment the method further comprises injecting the mixture into an extruder, and ejecting the mixture out of the extruder and through the capacitor. Preferably, the molding batch is a polymer. A polymer may be a suitable material for the extrusion or base material which may be mixed with the tracer.

According to another exemplary embodiment of the method the capacitor is formed by a slit capacitor, in particular a plate capacitor. A slit or plate capacitor may be in particular advantageous in order to achieve a signal indicating a change in the capacitance of the capacitor which change may be caused by the molding batch including the indicator passing the slit of the capacitor. The capacitance may be measured by using a capacitance testing bridge or capacitance measuring bridge or else, e.g. a single capacity combined with a resistance.

According to another exemplary embodiment of the method the tracer comprises at least one material out of the group comprised of: $PbZr_{1-x}Ti_xO_3$, $YMnO_3$, $SrBi_2Ta_2O_9$, and $KNbO_3$. Preferably, $PbZr_{0.52}Ti_{0.48}O_3$ is used. It may also be possible to add a small amount of lanthanum, e.g. 3 mol % of lanthanum, and/or a small amount, e.g. less than 0.1%, of electrical conductive substances, e.g. carbon. In general a ferroelectric perowskite may be used as the indicator material. Such perowskite have a general structural formula of $ABO_3$, wherein A is a divalent metallic cation and B is a tetravalent metallic cation and O represents oxygen. These materials may exhibit spontaneous polarization, wherein the polarized state may not be linked to an external electric field. Thus, the functional interrelation between the polarization P and the electric field strength E may be no longer linear, but may have the form of a hysteresis curve. Analogous to the magnetic material properties the electrical properties are also classified by so-called ferroelectric and anti-ferroelectric behaviour. These ordered states, which cause the spontaneous polarization, may be destroyed when the so-called ferroelectric Curie temperature is exceeded. That is, in case the ferroelectric Curie temperature is reached the spontaneous polarization decreases to substantially zero.

According to another exemplary embodiment of the method the dielectric constant or permittivity of the tracer is at least 1000 times the dielectric constant of the molding batch. Preferably, the permittivity of the tracer is at least 10,000 times the dielectric constant of the molding batch. By using a tracer having such a high permittivity it may be possible to achieve a mixture causing a significant capacitance increase when the mixture is passed through the capacitor even in case only small amounts of the tracer are used.

According to another exemplary embodiment of the method the measuring is done at a frequency above 100 kHz.

That is, a measuring circuit which is used to measure the capacitance of the capacitor may be operated at a frequency of more than 100 kHz, e.g. at a frequency of 1 MHz. In particular, a voltage source for the measuring circuit may operate at such a frequency. By using such a high frequency for measuring it may be possible to achieve a signal which is substantially noise free or at least only comprises a suitable small level of noise. Preferably, a sampling rate of a used analog-to-digital transducer is greater than two times the frequency of the voltage source or voltage supply.

Next, further exemplary embodiments of the device for determining a residence time distribution will be explained. However, these embodiments also apply for the method of determining a residence time distribution, for the computer-readable medium, for the program element and for the usage of a tracer.

According to another exemplary embodiment of the device the plate capacitor is moulded into a block comprising quartz glass powder and silicone gluten. In particular, the plates of the plate capacitor is insulated by moulding the plate capacitor into a block, wherein the block comprises quartz glass powder which is cemented by a silica adhesive or glue. The block may be formed as a flange which can be used to fix the plate capacitor to an extruder. In particular, the block may enclose the whole plate capacitor or merely a portion of the plate capacitor, i.e. the flange may be formed by brass into which the two electrodes of the plate capacitor are molded by a molding mass, wherein the molding mass insulate the plate capacitor and comprises quartz glass powder which is cemented by a silica adhesive.

Summarizing the first exemplary aspect of the invention may be seen in the providing of a method for a continuous measurement of residence time distribution of a molding batch, e.g. a polymer, in an extruder. To determine the residence time distributions a tracer or indicator may be mixed into the base molding batch, wherein the tracer has ferroelectric properties and exhibits a ferroelectric temperature of above 120° C. A suitable tracer may be $PbZr_{1-x}Ti_xO_3$ (PZT), e.g. $PbZr_{0.52}Ti_{0.48}O_3$, wherein a small amount, e.g. 3 mol %, of lanthanum is added. Such a mixture may exhibit a ferroelectric curie temperature between 350° C. and 400° C. Therefore, such a mixture may be suitable as a tracer material for extrusion processes since in common extrusion processes the temperature of the molding batch will be between 100° C. and 300° C. For measuring the residence time distribution a capacitance change can be used caused by the polymer mixed with the tracer material passing a capacitor arranged at an output of the extruder.

Next, further exemplary embodiments of the device according to the second exemplary aspect will be explained. However, these embodiments also apply for the method of determining a residence time distribution.

According to another exemplary embodiment of the device at least a section of at least one of the plurality of capacitors is arranged at an outer surface of the cavity. That is, a first plate of a plate capacity may be arranged on the outer surface of the cavity. Also both plates of a plate capacity may be arranged on the outer surface of the cavity however in this case it is preferably ensured that the molding batch moves between the two plates, i.e. one plate is arranged at one side of the outer surface of the cavity while the other plate is arranged on another side, preferably the opposite side, of the outer surface of the cavity. A slit or plate capacitor may be in particular advantageous in order to achieve a signal indicating a change in the capacitance of the capacitor which change may be caused by the molding batch passing the slit of the capacitor. The capacitance may be measured by using a capacitance testing bridge or measuring bridge or else, e.g. a voltage divider comprising a capacitor and a resistor.

According to another exemplary embodiment of the device the cavity is formed as a portion of an extruder. In particular, the extruder may be formed as a screw extruder, i.e. an extruder having a screw arranged in the cavity which screw moves the material in the cavity from one side to another side of the extruder.

According to another exemplary embodiment of the device the cavity has a substantially cylindrical shape, and wherein a first subset of the plurality of capacitors is arranged along a longitudinal axis of the cavity. In particular, the first subset may include all capacitors of the device. By providing a plurality of capacitors in a consecutive way along the longitudinal axis of the cavity it might be provided an efficient way to determine residence time distribution profiles, i.e. to provide residence time distribution relating to different longitudinal sections of the cavity. In particular, the longitudinal axis may characterize the direction along which the molding batch moves on the path through the cavity.

According to another exemplary embodiment of the device the cavity is formed as a portion of a screw extruder, wherein one sub-element of at least one of the capacitances of the first subset is arranged on the screw of the screw extruder. That it, according to this exemplary embodiment one portion, e.g. one plate or electrode of capacity may be arranged on or in the screw, while the other one may be arranged on or in the outer surface of the cavity. Thus, an efficient way may be provided to ensure that the molding batch moves through space between the two plates or electrodes of one capacitor so that a possible change in a measured capacitance induced by the dielectric properties of the molding batch may be easily detected. In particular, it may be possible to use the whole screw as one electrode of a plurality of capacitors arranged along the longitudinal axis of the cavity. In this case the screw may be insulated and then electrically contacted by one contact, while the second electrodes of the respective capacitors are arranged individually, i.e. insulated from each other, on the outer surface of the cavity.

According to another exemplary embodiment of the device the cavity comprises an outlet, and a second subset of the plurality of capacitors is arranged at the outlet of the cavity, in such a way that the molding batch exiting through the outlet changes the capacitances of the capacitors of the second subset. By providing a second subset of capacitors, i.e. at least one capacitor, at the outlet of the cavity it might be possible to provide an efficient way to determine a total residence time distribution of the molding batch in the cavity, i.e. a residence time distribution characterizing the total time span the molding batch needs to move from an input of the cavity to the outlet of the cavity.

According to another exemplary embodiment the device further comprises a measuring circuit adapted to measure the capacitance of at least one of the plurality capacitors. Such a measuring circuit may for example comprise a voltage source and an analog-to-digital transducer to digitize the measured capacitances.

According to another exemplary embodiment of the at least two of the plurality of capacitors are arranged relative to each other in such a way that the electrical field of the first one has another direction than the electrical field of the second one. In particular, the at least two of the plurality of capacitors may be formed by plate capacitors, and the electrical fields of the two plate capacitors are substantially perpendicular to each other. That is, the two capacitors may have a different orientation in space, such that the respective electric fields are different in directions with respect to each other. For example, one electric field may be substantially in an x-direction of a reference system, while the other one may be substantially in a y-direction of this reference system. However, it is not mandatory that the two fields are substantially perpendicular to each other. For example, in the case more than two capacitors are arranged at the same position with respect to a longitudinal axis of the cavity the respective capacitors may be arranged evenly spaced along the circumference of the cavity. That is, in case of three capacitors each set of two individual capacitors may enclose an angle of 120°, in case of four capacitors each set may enclose an angle 90°, in case of five capacitors each set may enclose 72°, etc. Such an angular spaced arrangement may be also possible in case the capacitors are consecutively arranged along the long axis of the cavity, i.e. not at the same longitudinal position.

According to another exemplary embodiment the device further comprises a heater adapted to heat the molding batch. Such a heater may be an efficient way to ensure that a suitable temperature of the molding batch is provided.

According to another exemplary embodiment of the device the cavity is formed as a portion of an extruder, wherein the extruder comprises an outlet, wherein at least one of the plurality of capacitors is arranged at the outlet of the extruder in such a way that molding batch leaving the extruder through the outlet passed the at least one of the plurality of capacitors in such a way that the capacitance changes. Preferably, at least two of the plurality of capacitors are formed by plate capacitors which are arranged at the outlet. In particular, the two plate capacitors may be arranged in such a way that the directions of the respective two electric fields are different from each other, e.g. substantially perpendicular with respect to each other.

According to another exemplary embodiment of the device the two plate capacitors are arranged parallel to each other. In particular, the two capacitors may be arranged at the same position relative to a longitudinal axis of the extruder so that portions of the molding batch either move through the first of the two capacitors or through the second one. In an illustrative way it might be said that the two capacitors are connected parallel to each other with respect to the molding batch flow. That is, the two capacitors are not consecutively arranged, i.e. they are not arranged in such a way that a portion of the molding batch moves first through the first one and then through the second one of the capacitors, which arrangement might be called a series connection of the two capacitors with respect to the molding batch flow.

In particular, in case of the presence of more than one capacitor, i.e. more than two capacitor plates, a capacitance measurement may be performed in such that each single capacitance between each possible pair of plates may be measured. For example, in case of four plates or electrodes 1, 2, 3, and 4, the capacitances between electrode 1 and 2, 1 and 3, 1 and 4, 2 and 3, 2 and 4, and 3 and 4 are measured and afterwards analyzed.

According to another exemplary embodiment of the device the plate capacitor is moulded into a block comprising quartz glass powder and silicone gluten. In particular, the plates of the plate capacitor is insulated by moulding the plate capacitor into a block, wherein the block comprises quartz glass powder which is cemented by a silica adhesive or glue. The block may be formed as a flange which can be used to fix the plate capacitor to an extruder. In particular, the block may enclose the whole plate capacitor or merely a portion of the plate capacitor.

Next, further exemplary embodiments of the method according to the second exemplary aspect of the invention will be explained. However, these embodiments also apply for the device for determining a residence time distribution.

According to another exemplary embodiment the method further comprises mixing the molding batch with a tracer material before it is introduced into the cavity. It is explicitly noted that all exemplary embodiments described in connection with the tracer of the first exemplary aspect may be combined with the tracer of the second exemplary aspect.

Summarizing an exemplary aspect of the invention may be seen in the providing of a device for a continuous measurement of residence time distribution of a molding batch, e.g. a polymer, in an extruder. Furthermore, by providing a plurality of capacitors for measuring it might be possible to determine a plurality of residence time distributions which might be called residence time profiles for different portions of the extruder. Thus, it might be possible to provide a fine segmented analysis concerning the residence time distributions of sections of the extruder. To determine the residence time distributions preferably a tracer or indicator may be mixed into the base molding batch, wherein the tracer has ferroelectric properties and exhibits a ferroelectric temperature of above 120° C. A suitable tracer may be $PbZr_{1-x}Ti_xO_3$ (PZT), e.g. $PbZr_{0.52}Ti_{0.48}O_3$, wherein a small amount, e.g. 3 mol %, of lanthanum is added. Such a mixture may exhibit a ferroelectric curie temperature between 350° C. and 400° C. Therefore, such a mixture may be suitable as a tracer material for extrusion processes since in common extrusion processes the temperature of the molding batch will be between 100° C. and 300° C. For measuring the residence time distribution a capacitance change can be used caused by the polymer mixed with the tracer material passing a capacitor arranged at an output of the extruder.

The aspects defined above and further aspects of the invention are apparent from the examples of embodiment to be described hereinafter and are explained with reference to these examples of embodiment. It should be noted that features described above in connection with one exemplary embodiment or aspect of the invention may be combined with another exemplary embodiment or aspect.

BRIEF DESCRIPTION OF THE DRAWINGS

The invention will be described in more detail hereinafter with reference to examples of embodiment but to which the invention is not limited.

FIG. 1 schematically illustrates an extruder having a plurality of capacitors attached to it, wherein the capacitor can be used for measuring a capacitance.

FIG. 2 schematically illustrates a plate capacitor which can be used in the extruder device of FIG. 1.

FIG. 3 schematically shows a flange enclosing a slit capacitor.

FIG. 4 schematically illustrates an equivalent circuit for a capacitance measurement.

FIG. 5 schematically illustrates an equivalent circuit for the coupling of the plurality of capacitors.

DESCRIPTION OF AN EXEMPLARY EMBODIMENT

Figure 6A:
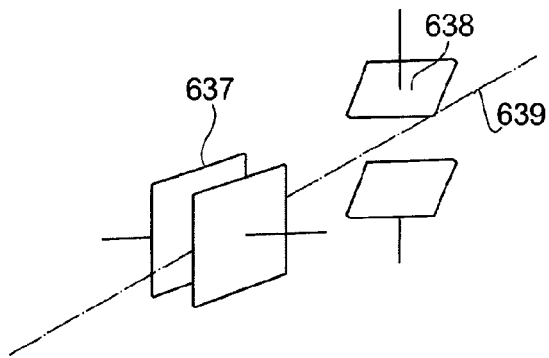
FIG. 6 schematically illustrates relative arrangements of the some of the plurality of capacitors.

The illustration in the drawings is schematically. In different drawings, similar or identical elements are provided with similar or same reference signs.

In the following, referring to FIGS. 1 to 6, an extruder and a method for determining residence time distribution is described.

FIG. 1 schematically shows an extruder or extruder device 100, having a screw 101 which is used to move a molding batch, e.g. a polymer, through the extruder. The extruder 100 further comprises an input 102, which is connected to a container 103. In FIG. 1 the molding batch is schematically shown as 104 in the container 103. Into the molding batch an indicator or tracer is introduced, by introducing a pressed tracer pellet. The pressed tracer pellet is then grinded to a plurality of tracer particles during the path through the extruder, which grinded particles are schematically shown as the dots 105 in the molding batch. For illustration a further tracer pellet 105 is shown in the container 103. Furthermore, the extruder 100 comprises an outlet 106 to which a plate capacitor, schematically shown as box 107, is connected. The plate capacitor forms a slit capacitor. The extruder may also comprise a heater (not shown) which can be arranged in the container or in the cavity the screw is arranged in as well. Additionally to the slit capacitor 107 a plurality of capacitors 119 to 130 are arranged at the extruder 100 and the screw 101. That is, one plate, made of copper, for example, of each of the plurality of capacitors 119, 120, 121, 125, 126, 127 is arranged on or in the outer surface of the extruder. It might be also possible that these plates are not directly arranged on the surface of the extruder but may be arranged having some distance to the outer surface of the extruder. The second plates 122, 123, 124, 128, 129, 130 of each capacitor of the plurality of capacitors may be arranged on or in the screw. The second plates, which are insulated from each other, may be contacted through holes in the outer surface of the extruder. Alternatively, to the shown arrangement of the plurality of insulated and electrically isolated second plates it is also possible to use the screw 101 itself as the second plates of all of the plurality of capacitors. In this case only one contact for the screw 101, i.e. for all second plates, is necessary.

In FIG. 1 the progress of the tracer particles 105 is schematically shown to be about the middle of the extruder. However, preferably the tracer is only mixed into the molding batch in a pulsed manner, i.e. by introducing only one single pellet in a time span, in order to make it possible that a real residence time distribution is determinable by the method according to an exemplary embodiment of the invention. The single pellet is then grinded into a plurality of tracer particles, wherein these tracer particles are distributed in a way that most of the tracer particles are present at the front edge of a tracer particles front (in FIG. 1 to the right) while the number of tracer particles decreases monotonous from this front edge to the back edge (in FIG. 1 to the left side).

FIG. 2 schematically shows a slit capacitor 207 which can be used as the plate capacitor 107 in FIG. 1. The slit capacitor 207 comprises a first plate 208 and a second plate 209. At the two ends of the plates 208 and 209 connecting plates 210, 211 and 212, 213, respectively are arranged, which can be used to connect the slit capacitor 207 onto the extruder or onto a outlet pipe or tube. The connecting pipes 210 and 212 may be moulded into a flange which is schematically shown in FIG. 3.

For the capacitance of a plate capacitor the correlation between the geometric parameters and the capacitance is given by:

$$C = \epsilon_r \cdot \epsilon \cdot A/d,$$

wherein:
C represents the capacitance in pF,
$\epsilon_r$ represents the relative dielectric constant,
$\epsilon$ represents the vacuum dielectric constant in As/Vm
A represents the area of the plates in $cm^2$,
d represents the distance between the two plates in cm
from this equation the proportional or linear correlation between the dielectric constant and the capacitance can be derived, in case the geometry of the plate capacitor is constant.

In FIG. 3 a flange 313 is schematically shown into which an end of the slit capacitor 207 is moulded. The connection plates 210 and 212 of the slit capacitor 207 are schematically depicted in FIG. 3. The flange can be formed by quartz glass granulate glued by a silica glue or gluten. The flange 313 comprises a plurality of holes 314 which can be used to fix the flange 313 and thus the slit capacitor 207 to an outlet of an extruder.

FIG. 4A schematically shows an equivalent circuit for a capacitance measurement. The circuit 415 comprises an alternating voltage supply 416 which can be formed by a frequency synthesizer. When the frequency of the frequency synthesizer is chosen to be sufficient high, i.e. above 100 kHz, e.g. 1 MHz, it might be possible to reduce the noise generated by the circuit significantly. Furthermore, the equivalent circuit 415 comprises the measuring capacitor 107, e.g. the capacitor connected to the outlet of the extruder, and a measuring resistor 417. Preferably, the measuring resistor has a resistance of 50Ω. Additional a measuring or determination device 418, e.g. an analog-to-digital transducer, is shown in FIG. 4A. As the measuring device an oscillograph may be used. Preferably, the sampling rate of the analog-to-digital transducer is greater than two times the frequency of the frequency synthesizer, i.e. the frequency of the voltage supply 416. Furthermore, the measuring resistor 417 is grounded.

FIG. 4B schematically shows the shielding of the capacitor or the measuring cell. In FIG. 4B the voltage supply 416 is schematically shown which is connected to on plate of the capacitor 107 which forms the measuring capacitor. The second plate of the capacitor 107 is connected to a measuring resistor 417. An analog-to-digital transducer 418 is also shown in FIG. 4B which is parallel connected to the measuring resistor. Furthermore, a flange 413 is schematically shown in FIG. 4B which is also grounded. By using such a shielding it might be possible to reduce the noise generated by the measuring cell considerably.

FIG. 4C schematically shows the equivalent circuit of FIG. 4B. Additionally to the elements shown in FIG. 4A, i.e. the voltage supply or voltage source 416, the measuring capacitor 107, the measuring resistor 417 and the analog-to-digital transducer 418, two parasitic capacities 450 and 451 are shown both of which are connected to ground.

FIG. 5 schematically shows an equivalent circuit for the coupling of the plurality of capacitors. In particular FIG. 5 shows that one electrode of each of the plurality of capacitors 531, 532, 533, 534 and 535 may be connected to an input terminal of a multiplexer 536, while the other plate of each of the plurality of capacitors may be connected to a common voltage source 516. The plurality of capacitors may form a so called measuring cell. The usage of a plurality of capacitor may enable to perform an analysis of the residence time distributions having a position resolution, i.e. the determination of the residence time distribution can be made depending on the position in the extruder. For the measurement of the capacitances of parallel connected capacitors it may be possible to activate the capacitors in a delayed manner, i.e. activate one capacitor after the other.

FIG. 6 schematically illustrates relative arrangements of the some of the plurality of capacitors.

FIG. 6A schematically shows the arrangement of two capacitors 637 and 638 relative two each other. The two capacitors are formed by plate capacitors, each having two plates. The two capacitors 637 and 638 are arranged consecutively along a schematically shown axis 639 in such a way that the electric field of the first capacitor 637 is substantially perpendicular to the electric field of the second capacitor 638. By using the shown arrangement it might be possible to analyze a longitudinal and a cross sectional residence time distribution of molding batch passing through the capacitors.

Figure 6B:
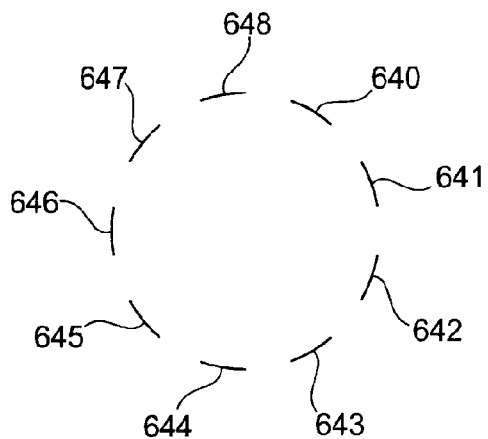

FIG. 6B schematically shows another arrangement of a plurality of capacitors 640, 641, 642, 643, 644, 645, 646, 647 and 648 relative two each other. Each of the capacitors is formed by a single plate or electrode arranged circumferential to a cylindrical extruder surface, which is not shown for sake of clarity. By using such a circumferential arrangement it may be possible to perform an analysis which might be called capacitance tomography due to the similarity to the known computer tomography in the medical field. That is, it might be possible to perform a fine segmented analysis of the residence time distributions with respect to a cross section of the extruder. Such a capacitance tomography may be performed by measuring each single capacitance between each possible pair of plates. Thus, in the shown case each possible permutation of pairs of the nine electrodes 640 to 648 is measured and afterwards analyzed. For example, the capacitances between electrode 640 and 641, 640 and 642, 640 and 643, and so on, and 641 and 642, 641 and 643 and so on are measured. That is, in total 45 capacitances are measured and afterwards analyzed. The measured capacitances may be used to generate an image showing the dielectric constant or relative permittivity along the cross-section of the extruder.

Figure 6C:
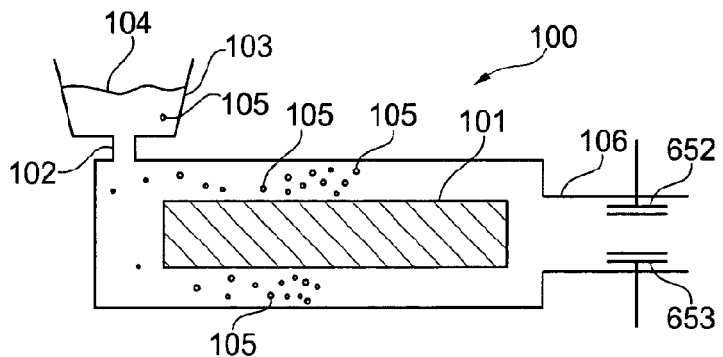

FIG. 6C schematically shows another arrangement of two measuring capacitors for measuring a residence time distribution of a molding batch in an extruder. The extruder is similar to that shown in FIG. 1. FIG. 6 schematically shows an extruder 100, having a screw 101 which is used to move a molding batch, e.g. a polymer, through the extruder. The extruder 100 further comprises an input 102, which is connected to a container 103. In FIG. 6 the molding batch is schematically shown as 104 in the container 103. Into the molding batch indicator or tracer particles are dispersed, which is schematically shown as the dots 105 in the molding batch. As described in connection with FIG. 1 the tracer particles may be generated by the grinding of a single tracer pellet in the extruder. Furthermore, the extruder 100 comprises an outlet 106. Contrary to the extruder shown in FIG. 1 two capacitors 652 and 653 are arranged parallel to each other in the area of the outlet 106.

For testing the properties of such a slit capacitor, in particular the responding of the capacitor to a molding batch having ferroelectric tracer incorporated therein, a slit capacitor was manufactured. The testing slit capacitor comprises plates of 3.4 cm×5.5 cm, wherein the width of the slit between the plates is about 0.5 mm.

For the testing $PbZr_{0.52}Ti_{0.48}O_3$ (PZT) including 3 mol % of lanthanum was used as the tracer. The tracer was mixed to the molding batch in five different amounts in order to examine the influence of the tracer on the measured capacitance. For the tested range between 0 vol % and 10 vol % of tracer a substantially linear increase in the measured capacitance could be found. In detail the following capacitances were measured.

| Vol % PZT | C in pF |
|---|---|
| 0 | 89 |
| 1 | 93 |
| 3 | 100 |
| 5 | 110 |
| 10 | 121 |

Summarizing an exemplary aspect of the invention may be seen in the providing of a method for a continuous measurement of residence time distribution of a molding batch, e.g. a polymer, in an extruder. To determine the residence time distributions a tracer or indicator may be mixed into the base molding batch, wherein the tracer has ferroelectric properties and exhibits a ferroelectric temperature of above 120° C. The use of $PbZr_{0.52}Ti_{0.48}O_3$ as a tracer material shows a clear increase in the measured capacitance. Thus, it might be possible to use such a material or any other suitable ferroelectric material having a curie temperature of above 120° C. as a suitable material for determining the residence time distribution of a molding batch in an extruder.

It should be noted that the term "comprising" does not exclude other elements or features and the "a" or "an" does not exclude a plurality. Also elements or features described in association with one embodiment or aspect may be combined with elements or features described in association with another embodiment or aspect. It should also be noted that reference signs in the claims shall not be construed as limiting the scope of the claims.

The invention claimed is:

1. A method of determining a residence time distribution, the method comprising:
   mixing a molding batch and a tracer, wherein the tracer has a ferroelectric curie temperature above 120° C.;
   transmitting the mixture through a capacitor;
   measuring a capacitance of the capacitor, wherein measuring is performed at a frequency above 100 kHz; and
   determining a residence time distribution based on the measured capacitance.

2. The method according to claim 1, further comprising:
   heating the mixture to a temperature above 120° C. before transmitting the mixture through the capacitor.

3. The method according to claim 1, further comprising:
   detecting a change in the measured capacitance; and
   determining the residence time distribution based on the detected change.

4. The method according to claim 1, further comprising:
   injecting the mixture into an extruder; and
   ejecting the heated mixture out of the extruder and through the capacitor.

5. The method according to claim 1, wherein the capacitor is formed by a slit capacitor.

6. The method according to claim 1, wherein the tracer comprises at least one material out of the group comprised of: $PbZr_{1-x}Ti_xO_3$, $YMnO_3$, $SrBi_2Ta_2O_9$, and $KNbO_3$.

7. A method of determining a residence time distribution of a molding batch in a device comprising a cavity, and a plurality of capacitors arranged at the cavity, the method comprising:
   introducing a molding batch into the cavity, the molding batch having a tracer, the tracer having a ferroelectric curie temperature above 120° C.;
   measuring the capacitances of the plurality of capacitors, wherein measuring capacitances is performed at a frequency above 100 kHz; and
   determining the residence time distribution based on the measured capacitances.

* * * * *